Oct. 2, 1956  J. A. JACKSON  2,765,011
LOG DEBARKER UTILIZING RUBBING ACTION OF RUBBER-TIRED WHEELS
Filed June 23, 1955  4 Sheets-Sheet 1
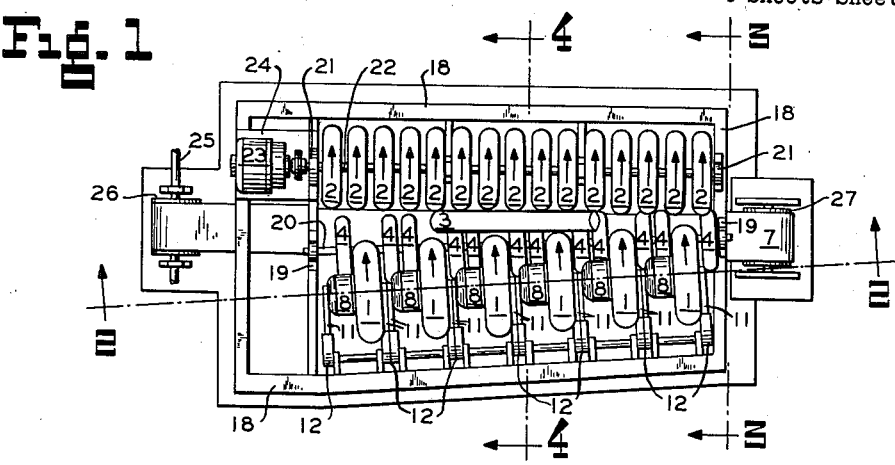
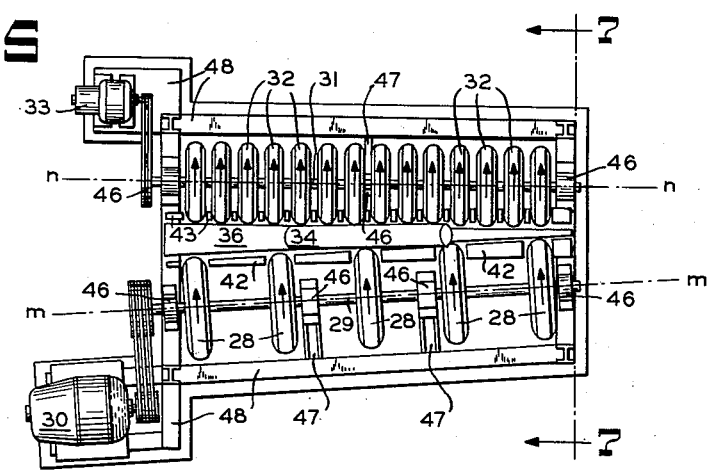
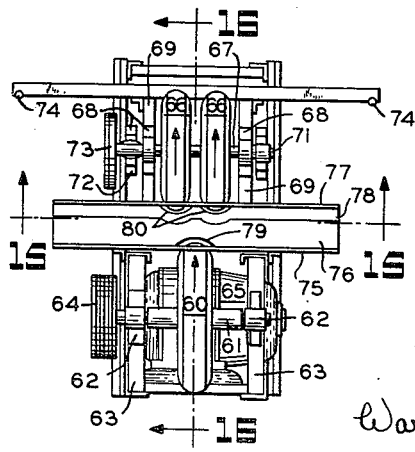
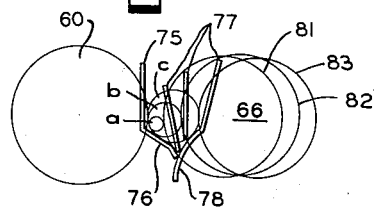
INVENTOR.
JESSE A. JACKSON
BY
Ward, Neal, Haselton, Orme & McElhannon
ATTORNEYS Oct. 2, 1956  J. A. JACKSON  2,765,011
LOG DEBARKER UTILIZING RUBBING ACTION OF RUBBER-TIRED WHEELS
Filed June 23, 1955  4 Sheets-Sheet 2
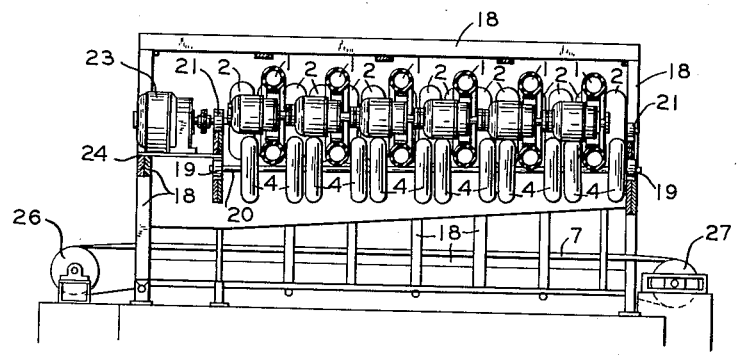
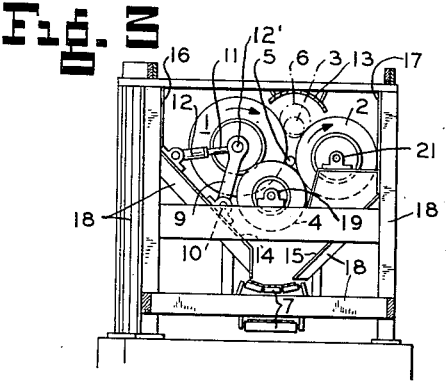
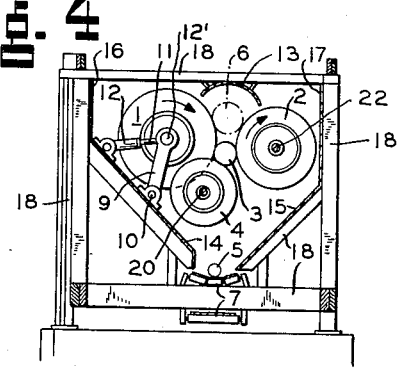
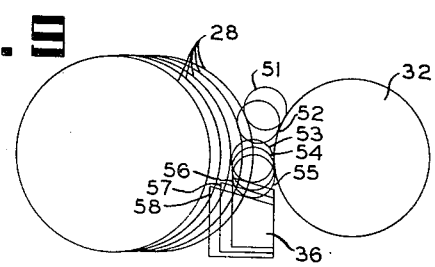
INVENTOR.
JESSE A. JACKSON
BY
Ward, Neal, Haselton, Orme & McElhannon
ATTORNEYS Oct. 2, 1956  J. A. JACKSON  2,765,011
LOG DEBARKER UTILIZING RUBBING ACTION OF RUBBER-TIRED WHEELS
Filed June 23, 1955  4 Sheets-Sheet 3
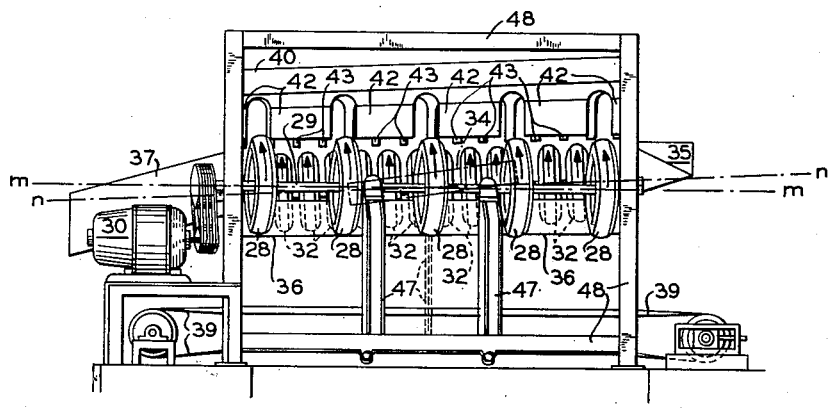
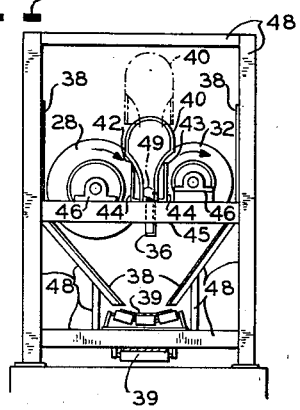
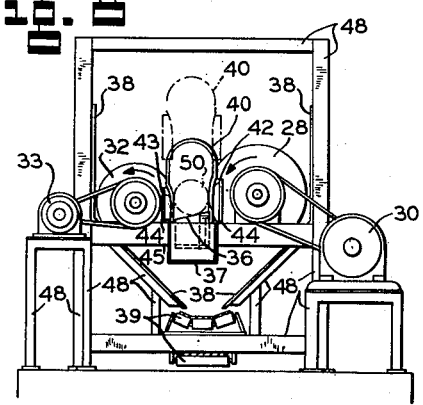
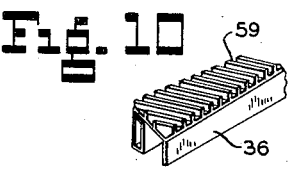
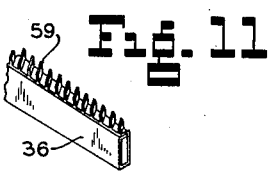
INVENTOR.
JESSE A. JACKSON
BY
Ward, Neal, Haselton, Orme & McElhannon
ATTORNEYS Oct. 2, 1956   J. A. JACKSON   2,765,011
LOG DEBARKER UTILIZING RUBBING ACTION OF RUBBER-TIRED WHEELS
Filed June 23, 1955   4 Sheets-Sheet 4

INVENTOR.
JESSE A. JACKSON
BY
Ward, Neal, Haselton, Orme & McElhannon
ATTORNEYS

United States Patent Office 2,765,011
Patented Oct. 2, 1956

2,765,011

LOG DEBARKER UTILIZING RUBBING ACTION OF RUBBER-TIRED WHEELS

Jesse A. Jackson, Jacksonville, Fla.

Application June 23, 1955, Serial No. 517,411

15 Claims. (Cl. 144—208)

This invention relates to the removal of bark from the logs of trees, and more particularly to a machine for removing the bark efficiently without damage to the woody fibers of the log.

The machine consists essentially of sets of rotating rubber-tired wheels mounted on a driven shaft and preferably so arranged that one set, driven at relatively high speed, removes the bark by rubbing action, while another set driven at relatively low speed, rotates the log and controls its spinning action as it progresses through the machine.

The machines for this purpose which have heretofore been used in the forest products industries are of several types, all of which cause a loss of or damage to the wood fiber while removing the bark. In the pulp and paper industry, which is the largest user of barked wood, the method most in vogue is to tumble the logs in rotating steel drums, thus rubbing the bark off. This bruises the wood below the cambium layer, and loosens or "brooms" the ends of the logs with a resultant loss of good fiber that may be as high as 5 to 8%, since the damaged fibers do not make desirable pulp while they uselessly consume chemicals used in the cooking process. The hydraulic types of debarkers which are extensively used in the northwest also cause considerable damage since, in order to remove the bark, they must use such high pressures in their water jets as to splinter the wood below the cambium layer. With the smaller size logs, this damage may be considerably more than that from the drum type barker. Other types of barkers employ rotating wheels with metal teeth, wheels with hinged lugs or arrangements of flailing or rubbing chains, all of which, if they effectively remove the bark, also remove or damage an appreciable amount of the good fibers. In fact, for all the existing types now employed, and in view of the millions of cords of barked wood which are consumed annually, the loss of good fiber represents a serious loss to the national economy.

The various features of the invention are shown in, but not limited, to the practical embodiments in the accompanying drawings as follows:

Figure 1 is a plan view with upper frame of the machine removed, an embodiment of the machine being here shown having a row of rubbing wheels each separately supported and driven but substantially in a common line, a row of regulating wheels mounted on and driven by a single shaft, and a row of positioning wheels mounted on a common shaft but free to turn individually.

Figure 2 is a longitudinal vertical section of the embodiment of Figure 1, taken on the line 2—2 of Fig. 1, with hopper plates removed on the near side;

Figure 3 is a sectional end view, taken on the line 3—3 of Figure 1;

Figure 4 is a transverse vertical section, taken on the line 4—4 of Fig. 1;

Figure 5 (Sheet No. 1) is a plan view with upper frame removed, of an embodiment having a row of rubbing wheels mounted on and driven by a single shaft, a row of regulating wheels mounted on and driven by a common shaft, and a fixed work rest mounted between and slightly below the rows of wheels;

Figure 6 (Sheet No. 3) is an elevation of the embodiment of Fig. 5 with hopper plates removed on the near side;

Figure 7 is a sectional end view, taken on the line 7—7 of Fig. 5;

Figure 8 is an elevation of the left-hand end of Fig. 5;

Figure 9 (Sheet No. 2) is a diagram of the various positions of the cross section of a log in passing each of the rubbing wheels of the embodiment of Figs. 5, 6, 7 and 8;

Figures 10 and 11 (Sheet No. 3) show isometric views of an alternative design for the work rest of the machine of Fig. 5;

Figure 12 (Sheet No. 1) is a plan view of an embodiment, suitable for portable use during logging operations in the woods, such as for truck or trailer mounting or for similar ease of transportation;

Figure 17 (Sheet No. 1) shows a diagram of the various positions for adjustment of the regulating wheels to suit small, medium and large size logs with the machine of Fig. 12.

Figure 13:
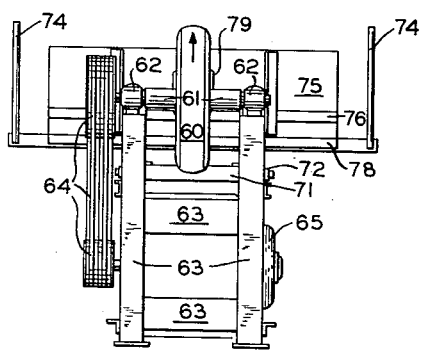
Figure 13 (Sheet No. 4) is an elevation of the embodiment of Fig. 12.

In the operation of the machine of Fig. 1, the log enters the machine at the right-hand end, and is introduced either manually or by a conveyor (not shown). Rubber-tired rubbing wheels 1 are shown in their normal positions, having axes of rotation normally coaxial so as to lie on a common center line 2—2, which in the plan view of Fig. 1 coincides with the section line 2—2 and is disposed at a small angle horizontally from a common fixed axis of rotation of rubber-tired regulating wheels 2. This alignment determines that a log of average size will be supported by wheels 1 and 2 when it enters the machine as shown at 3 in Fig. 3. When this log has progressed (to the left in Fig. 1) midway of the machine, it will tend to assume a position as at 3 in Fig. 4 where it will be supported from below by rubber-tired positioning wheels 4 for the best bark-removing action of the rubbing wheels 1. This alignment also determines that the log will be tilted with its forward end downward as it progresses from right to left through the machine. Such an alignment of the log, together with the fact that its natural position in Fig. 4 is lower than in Fig. 3, demonstrates that the log will tend to slide downhill from right to left (in Fig. 1), thus progressing through the machine by force of gravity. Such action is assisted by the spinning and vibrating of the log due to the action of the regulating wheels 2 and the rubbing wheels 1, which turn in the direction of the arrows shown thereon. Still higher rates of production could be achieved if desired, by tilting the whole machine up on the right-hand end.

A log of average size is shown at 3 in Fig. 1 to demonstrate the tilted alignment of the log midway of the machine as it is supported between two of the rubbing wheels 1 and the adjacent regulating wheels 2. A log of small size is shown at 5 in Figure 3. It may be noted from Fig. 4, midway of the machine, that the small log will have dropped through between wheels 2 and 4 to a conveyor 7 below, which takes both bark and logs from the machine. This is desirable, since the small log will have had its most effective barking at the entering end of the machine. A log of large size is shown at 6 in Figs. 3 and 4, to demonstrate how it is supported by wheels 1 and 2 and moves lower as it progresses through the machine. At these positions, the bark is partly removed, but the most effective barking occurs for large logs at the left-hand end of the machine where the spacing between wheels 1 and 2 allows it to drop down to be supported from below by the positioning wheels 4.

The rubbing wheels 1 are driven by individual motors 8 (Fig. 1), each supported on two pivoted arms 9 (see Figs. 3, 4), pivotally supported at 10. Each motor frame is fixed to the end of that arm 9 which supports it at its back end. Each pair of arms 9 which supports one assembly of a motor 8 and a wheel 1, should be joined together rigidly by a strut (not shown) so they will swing together about the pivots 10. Each arm 9 is restrained in its pivoting action by means of telescoping rods 11 acting on coiled springs enclosed in cylinders 12, such rods being pivotally mounted at shaft 12'. This mechanism keeps the wheels 1 normally in alignment on the center line 2—2, and permits each one to move away momentarily due to any irregularities of shape or protuberances on the spinning logs. This action also contributes to the progress of the log lengthwise through the machine.

The regulating wheels are spaced close to each other in order to provide effective contact with the log for the spinning and regulating action. The number of rubbing wheels is the maximum which can be included in the space available as determined by the axial length required for the driving motors and supporting linkages.

Shown in Figs. 3 and 4 is a cover plate 13, which is of curved shape and extends the length of the machine to prevent logs from bouncing out of position. Hopper plates 14 and 15 and side plates 16 and 17 catch the bark as it flies off and direct it to the conveyor 7 below.

The whole machine is supported by a frame 18, preferably of welded steel construction to give strength and rigidity. Brackets 19 support a fixed shaft 20 for the positioning wheels 4, which are each free to rotate individually on their own bearings. Bearings 21 support a driven shaft 22 to which the regulating wheels 2 are fixed. A motor and gear assembly 23 which drives the regulating wheels 2 is mounted on a base 24 rigidly attached to the frame 18.

The drive for the conveyor 7 is by any suitable means through a shaft 25. A head pulley 26 and tail pulley 27 of the conveyor 7 are shown mounted on extensions of the foundation. However, if the whole machine is to be tiltable in order to increase its speed of production, the whole conveyor may be mounted on suitable extensions of the frame 18. This also applies to the other modification described below.

The tire pressures used for the rubbing wheels 1 and regulating wheels 2 should be quite low compared to those ordinarily used in automotive transportation. Pressures used in the positioning wheels 4 may be somewhat higher.

In the modification of Fig. 5, rubbing wheels 28 are mounted on and driven by a single shaft 29 by any suitable means such as a belt-connected motor 30. This shaft is disposed at a slight angle horizontally from a shaft 31 which mounts and drives regulating wheels 32 from any suitable means such as a belt-connected motor 33. A log 34 of average size is shown midway of the machine to illustrate its tilted alignment, also shown in dot and dash outline in Fig. 6.

A log of any size enters the machine from the right through a tapering chute 35, and is rotated with a spinning action by the regulating wheels 32, turning in the direction of the arrows, and at relatively low speed. The bark is removed by the rubbing wheels 28 turning at relatively high speed. The spacing between the rubbing wheels 28 is made to suit the length of logs which the machine is to handle, so that at least two, but preferably not more than two, rubbing wheels 28 will be in contact with the log at any time as it passes from right to left through the machine. This is to permit a log of curved shape lengthwise to be barked evenly on all sides.

When the log reaches a point in the machine where it will drop down between the rubbing wheels 28 and regulating wheels 32, it is supported from below by a work rest 36. The upper surface of the work rest 36 is sloped toward the regulating wheels 32 in order to provide steadier contact, and its elevation lengthwise is higher at the right-hand end than at the left-hand end in order to support any size log so that its center line is at or slightly below a common line joining the centers of any adjacent rubbing and regulating wheels.

In addition to the horizontal angle between the shafts 29 and 31 of the rubbing and regulating wheels as shown in Fig. 5, these shafts, and consequently the rows of wheels fixed thereto, may, if desired, be tilted vertically with respect to each other in the manner shown by center lines m—m and n—n in Fig. 6. This is to assist in the traversing of the log from right to left through the machine, in the same manner as in the well-known centerless grinder for metal parts. Such an effect is desirable, since the rubbing wheels are not mounted movably with respect to the regulating wheels as is done in the embodiment of Fig. 1.

The barked log leaves the machine via a chute 37 (see Fig. 6), while the bark drops between hopper plates 38, and is removed by a conveyor 39. The log in progress through the machine is kept from bouncing upward by a curved shield 40 which is shown in its operating or lower position in Figs. 7 and 8, and in its inoperative or raised position in Fig. 6 and likewise in dot and dash outline in Figs. 7 and 8. Side skirt pieces 42 provide guards between the rubbing wheels 28 to keep the ends of the logs from striking the side walls of the tires. Similar side skirt pieces 43 are provided to protect the regulating wheel tires. Side skirt pieces 42 and 43 are supported by the curved shield 40 to which they are welded, and the whole assembly is supported in its lower position by brackets 44 resting on end beams 45 of the machine frame. The shield and side skirt piece assembly can be lifted to its raised position and supported by any suitable means in order to give access for disassembly of the rotating parts.

Bearings 46 support the shafts 29 and 31 of the rubbing and regulating wheels. Brackets 47 support the intermediate bearings. Frame members 48 are of welded steel construction to give the whole assembly strength and rigidity.

A log of smallest size is shown at 49 in Fig. 7, supported on the work rest 36. A log of largest size is shown at 50 in Fig. 8 supported on the work rest 36. Fig. 9 shows the different positions a log of average size will assume as it successively passes between each of the rubbing wheels 28 and the row of regulating wheels 32. Thus numeral 51 indicates the position of the log at the first wheel 28 on the right-hand end of the machine. At the second wheel, proceeding to the left, the log is supported at 52 in a lower position. At 53 in the middle of the machine, the log has dropped down between the tires and is supported from below by the work rest 36, which here has an alignment at 56. At the next two wheels, the log still moves slightly lower as at 54 and 55 due to the sloping alignment of the work rest 36, as shown at 57 and 58.

Figs. 10 and 11 show an alternative arrangement for the left and right ends respectively, of the work rest 36. Bars 59 are welded to the top of the work rest at an angle so that the spinning log, when it comes in contact, will be fed faster through the machine. The upper edges of the bars have the same slope toward the regulating wheels 32, and their upper edges should be at the same height as the smooth surface of the work rest as shown in Figs. 7 and 8.

In the embodiment of Figs. 12–17, a single rubbing wheel 60 is mounted on a shaft 61 supported by bearings 62 on fixed frame members 63, and driven through pulleys and belts at 64 by a motor 65 in the direction of the arrows shown. Two regulating wheels 66 are mounted on a shaft 67 supported by bearings 68 on a pivoted frame 69 (see Figs. 14, 15), and driven through pulleys and belts 73 by a motor 70 in the direction of the arrows shown. The pivoted frame 69 is supported by a shaft 71 and bearings 72 from the fixed frame 63, and is so arranged as to permit barking a log of any size by adjusting the clearance between the rubbing and regulating wheels. To permit the operator to make the adjustment, one of the members of the pivoted frame 69 is extended to carry a lever 74 on each side of the machine. Suitable means for holding the pivoted frame 69 in any particular position may be provided if desired.

In order to hold the log in alignment while it is being barked, guide plates 75 and 76 are fastened to the fixed frame 63 by suitable brackets, and guide plates 77 and 78 are likewise fastened to the pivoted frame 69. These guide plates are made with holes 79 and 80 through which the rubbing and regulating wheels protrude to contact the log.

Figure 14:
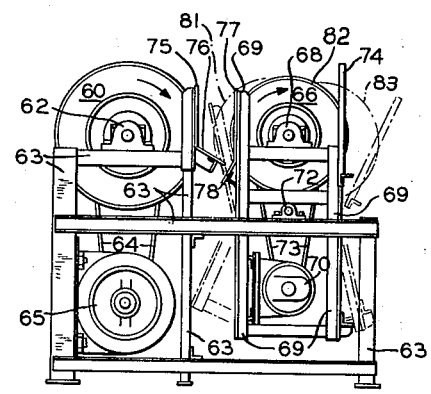
Figure 14 is an elevation of the right-hand end of the machine of Figure 12.
Figure 15:
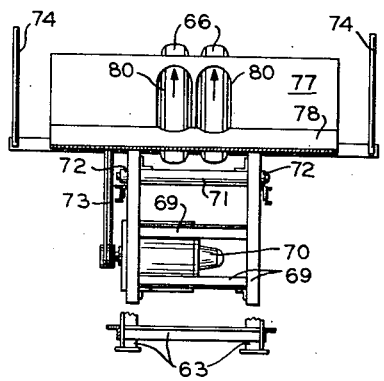
Figure 15 is a longitudinal vertical section taken on the line 15—15 of Figure 12.
Figure 16:
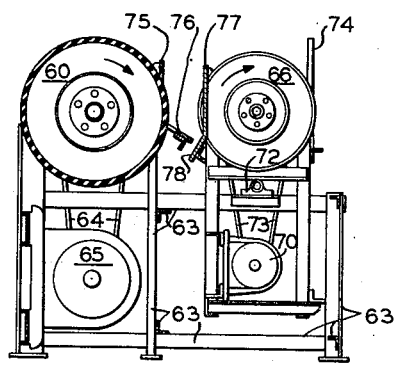
Figure 16 is a transverse vertical section taken on the line 16—16 of Figure 12.

In Fig. 14, the regulating wheel 66 is shown (by dot-dash lines) after it has been swung to the left (by tilting the frame 69 counterclockwise) for the smallest size log, and after it has been swung to the right (by tilting the frame 69 clockwise) for the largest size log.

In operation, the log is introduced endwise between guide plates 75 and 77, and is supported from below by plates 76 and 78, with the spacing of the wheels 60 and 66 adjusted by means of the levers 74 to suit the diameter of the log being barked. The length of plates 75, 76, 77, 78 is made greater than the length of logs being barked so that the center of gravity of the log will always be supported well within the ends of the plates as it progresses through the machine. The log is forced endwise through the machine by the operator pushing it with a pole having a sharp metal point stuck in the end of the log. In addition, or as an alternative, the whole machine can be tilted to allow the log to move through by gravity.

Fig. 17 shows diagrammatically how small, medium and large size logs (a), (b) and (c) are supported by the guide plates 75, 76, 77 and 78 in the various positions of wheels 66, shown at 81, 82 and 83, respectively.

In Fig. 14, the innermost position of the wheel 66 (shown by a dot-dash line) corresponds to aforesaid position 81, the intermediate position (shown by solid lines) corresponds to position 82, and the outermost position (shown by a dot-dash line) corresponds to 83.

The most desirable speeds for the various rubber-tired wheels to give an efficient and rapid debarking action without injuring the logs may be determined by trial adjustments. The treads of the rubber tires may be shaped as per any of the conventional types of tires used for automobile wheels.

Although certain particular embodiments of the invention are herein disclosed for purposes of explanation, various further modifications thereof, after study of this specification, will be apparent to those skilled in the art to which the invention pertains, reference should accordingly be had to the appended claims in determining the scope of the invention.

What is claimed and desired to be secured by Letters Patent is:

1. In apparatus for debarking logs, a plurality of rotatable side-by-side wheels with tires of rubber or the like and adapted to engage one side of a log to cause same to rotate and to regulate its position and rotation, at least one other rotatable wheel with a tire of rubber or the like and adapted to engage the other side of such log to rub bark therefrom as such log is rotated by said first-named wheels, and means for rotating said wheels.

2. Apparatus in accordance with claim 1, and in which the rotating means acts to rotate all said wheels in the same direction.

3. In apparatus for debarking logs, a plurality of rotatable side-by-side wheels with tires of rubber or the like and adapted to engage one side of a log to cause same to rotate and to regulate its position and rotation, at least one other rotatable wheel with a tire of rubber or the like and adapted to engage the other side of such log to rub bark therefrom as such log is rotated by said first-named wheels, and means for rotating said first-named wheels in a direction to engage such log with a generally upward motion, and means for rotating the other wheel at a higher speed and in a direction to engage such log with a generally downward motion.

4. In apparatus for debarking logs, a plurality of rotatable side-by-side wheels with tires of rubber or the like and adapted to engage one side of a log to rotate same and to regulate its rotation and position, a plurality of other rotatable wheels with tires of rubber or the like positioned to engage the other side of such log and to rub bark therefrom, and means to rotate said wheels including means to rotate said other wheels at a relatively higher speed as compared with the speed of rotation of said first-named wheels.

5. In apparatus for debarking logs, a plurality of rotatable side-by-side wheels with tires of rubber or the like and adapted to engage one side of a log to rotate same and to regulate its rotation and position, a plurality of other rotatable wheels with tires of rubber or the like positioned to engage the other side of such log and to rub bark therefrom, and means for mounting said other wheels with their axes located along a line diverging at a small angle with respect to the axis of the first-named wheels.

6. In apparatus for debarking logs, a plurality of rotatable side-by-side wheels with tires of rubber or the like and adapted to engage one side of a log to cause same to rotate and to regulate its position and rotation, at least one other rotatable wheel with a tire of rubber or the like and adapted to engage the other side of such log to rub bark therefrom as such log is rotated by said first-named wheels, and means located beneath the position of such log for supporting same while being engaged by the wheels.

7. In apparatus for debarking logs, the combination comprising pneumatically inflated rotatable means for engaging one side of a log to cause same to rotate and other pneumatically inflated rotatable means for engaging the other side of such log to rub bark therefrom.

8. Apparatus for debarking logs, comprising a series of rotatable side-by-side wheels with inflated tires and adapted to engage one side of a log to rotate same, and another series of rotatable wheels with inflated tires and adapted to engage the other side of such log to rub bark therefrom, the succeeding wheels of said other series being more and more spaced from opposed wheels of the first series whereby as a log advances endwise between the series of wheels it will move to lower positions.

9. In log-debarking apparatus, the combination of a series of rotatable side-by-side wheels with inflated tires and positioned along an axis which is tilted downwardly from the first wheel of the series, said wheels being adapted to engage one side of a log to rotate same, and another series of rotatable wheels with inflated tires and adapted to engage the other side of such log to rub bark therefrom, said other wheels being located along an axis which starting at the first wheel of the series is positioned at a horizontally diverging angle with respect to the axis of the first-named wheels.

10. Apparatus for debarking logs and the like, comprising a plurality of rotatable side-by-side wheels having tires of rubber or the like for engaging one side of a log to rotate same, and another opposed rotatable wheel or wheels with tires of rubber or the like and adapted to engage the other side of such log to rub bark therefrom, and means for yieldably urging the opposed wheels toward each other and against such log.

11. In log-debarking apparatus, the combination comprising rotatable inflated means for engaging one side of a log to rotate same, and another rotatable inflated means for engaging the opposite side of such log to rub bark therefrom, and rotatable means with surfaces of rubber or the like located beneath the position of such log for supporting same.

12. In log-debarking apparatus, the combination comprising rotatable inflated means for engaging one side of a log to rotate same, and another rotatable inflated means for engaging the opposite side of such log to rub bark therefrom, and means located beneath the position of such log for supporting same, said latter means having surfaces which slope generally downwardly toward said first rotatable means.

13. A log-debarking apparatus, comprising rotatable inflated means for engaging one side of a log, other and opposed rotatable inflated means for engaging the other side of such log, means for rotating both of said inflatable means in the same direction, means for mounting said opposed inflatable means along an axis diverging from the axis of the first inflatable means whereby as such log rotates it will advance along between and be free to move somewhat downwardly by the action of gravity.

14. In log-debarking apparatus, the combination comprising rotatable inflated means for engaging one side of a log, another rotatable inflated means for engaging the other side of such log, said other means being mounted along an axis which is positioned at slight angles both in a horizontal plane and a vertical plane, with respect to the axis of the first-named rotatable means.

15. In log-debarking apparatus, a plurality of rotatable rubber-tired wheels for engaging one side of a log to rotate same, another rubber-tired wheel or wheels rotatable at a higher speed but in the same direction as the first-named wheels for engaging the other side of such log to rub bark therefrom, and pivotally supported bearing means for one of such wheel means permitting same to be moved toward and away from the other wheel means.

References Cited in the file of this patent

UNITED STATES PATENTS

| | | |
|---|---|---|
| 305,322 | Merziger | Sept. 16, 1884 |
| 2,305,281 | Taylor et al. | Dec. 15, 1942 |
| 2,505,168 | Augustin | Apr. 25, 1950 |
| 2,652,867 | Boswell | Sept. 22, 1953 |

FOREIGN PATENTS

| | | |
|---|---|---|
| 28,183 | Germany | Aug. 2, 1884 |